United States Patent
Nakagawa

(10) Patent No.: US 7,635,500 B2
(45) Date of Patent: Dec. 22, 2009

(54) PARTICLE ARRANGEMENT APPARATUS AND PARTICLE ARRANGEMENT METHOD

(75) Inventor: Tohru Nakagawa, Shiga (JP)

(73) Assignee: PanasonicCorporation, Osaka (JP)

( * ) Notice: Subject to any disclaimer, the term of this patent is extended or adjusted under 35 U.S.C. 154(b) by 0 days.

(21) Appl. No.: 12/164,821

(22) Filed: Jun. 30, 2008

(65) Prior Publication Data

US 2008/0260951 A1    Oct. 23, 2008

Related U.S. Application Data

(63) Continuation of application No. PCT/JP2007/071127, filed on Oct. 30, 2007.

(30) Foreign Application Priority Data

Nov. 10, 2006   (JP)   ............................ 2006-305226

(51) Int. Cl.
    B05D 1/18   (2006.01)
    B05D 1/36   (2006.01)
(52) U.S. Cl. ............... 427/197; 427/198; 427/256; 427/273; 427/430.1; 118/407; 118/409; 118/416
(58) Field of Classification Search ........... 427/197, 427/198, 256, 275, 430.1, 434.4, 434.5; 118/416, 118/407, 409
   See application file for complete search history.

(56) References Cited

U.S. PATENT DOCUMENTS 6,872,645 B2   3/2005   Duan et al.
6,969,690 B2   11/2005  Zhou et al.
7,592,050 B2 * 9/2009   Watanabe et al. ......... 427/430.1
7,592,269 B2 * 9/2009   Jacobs ..................... 438/763
2005/0118338 A1 * 6/2005 Stebe et al. ................ 427/331
2005/0133372 A1  6/2005  Zhou et al.

FOREIGN PATENT DOCUMENTS

| JP | 57-134570 | 8/1982 |
| JP | 58-70860 | 4/1983 |
| JP | 2005-519201 | 6/2005 |
| JP | 2005-254094 | 9/2005 |
| JP | 2006-035129 | 2/2006 |
| WO | WO 03/075372 A2 | 9/2003 |

OTHER PUBLICATIONS

Huang, Y., et al., "Directed Assembly of One-Dimensional Nanostructures into Functional Networks", Science Reports, Jan. 26, 2001, pp. 630-633, vol. 291, www.sciencemag.org.
Wang, et al., "Germanium nanowire field-effect transistors with $SiO_2$ and high-$k$ $HfO_2$ gate dielectrics", Applied Physics Letters, Sep. 22, 2003, pp. 2432-2434, vol. 83 No. 12, American Institute of Physics.

* cited by examiner

*Primary Examiner*—Kirsten C Jolley
(74) *Attorney, Agent, or Firm*—McDermott Will & Emery LLP

(57) ABSTRACT

A particle arrangement apparatus of the present invention includes a tank for holding a dispersion of particles, a rotating means for rotating the substrate inside the tank to dip the substrate into the dispersion and to remove the substrate from the dispersion, and a coating means for applying a liquid different from the dispersion to the surface of the substrate when the substrate is not in contact with the dispersion.

11 Claims, 12 Drawing Sheets

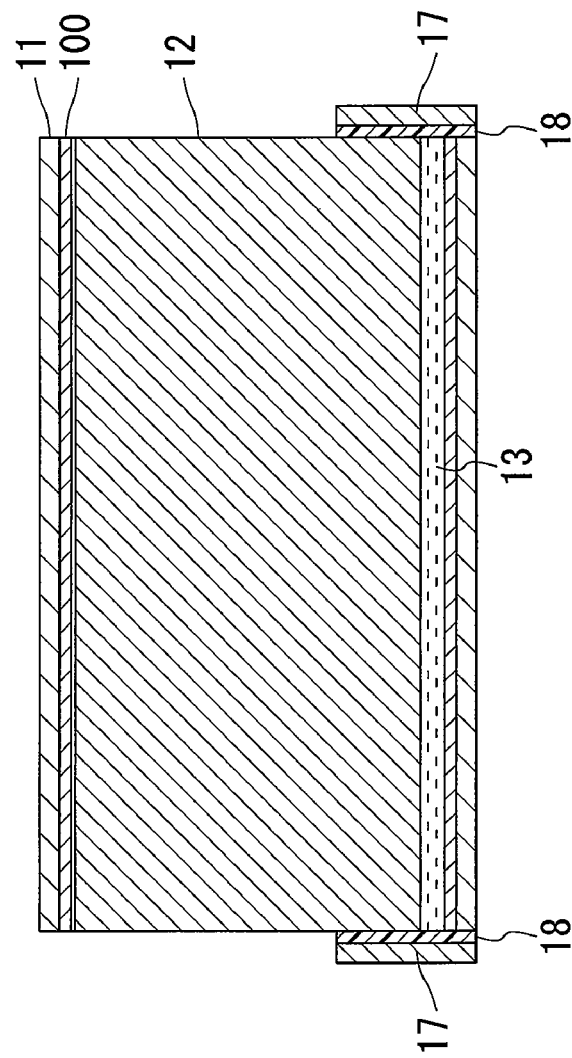
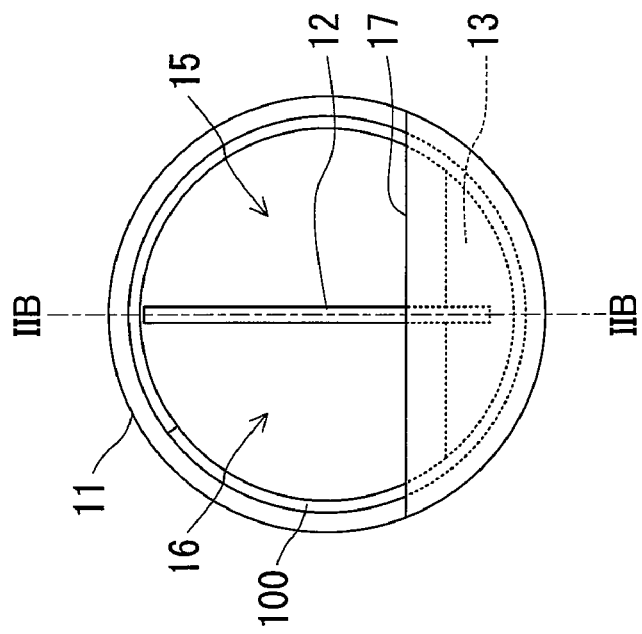
Fig. 2B
Fig. 2A

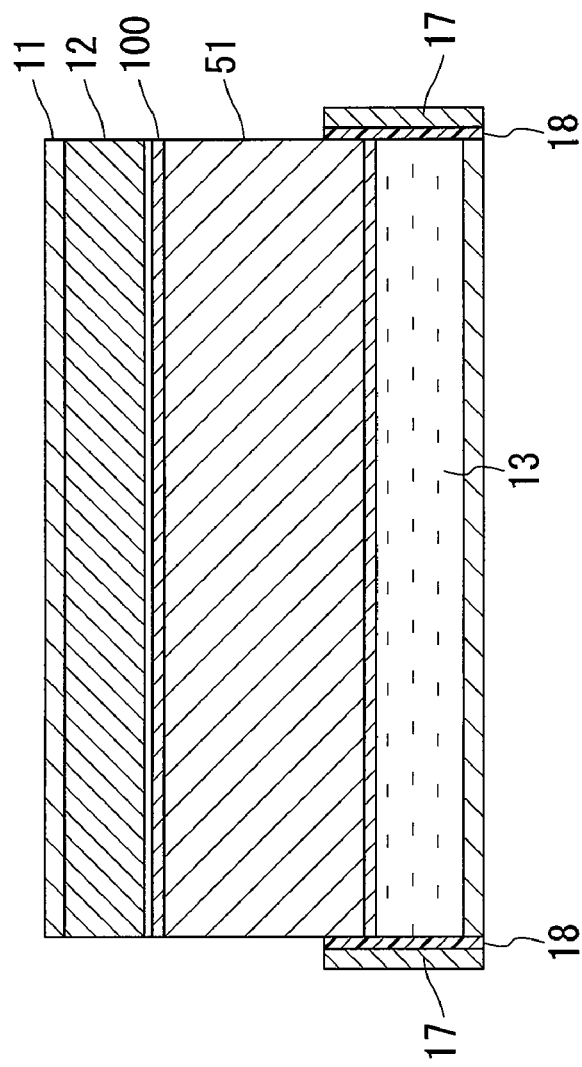
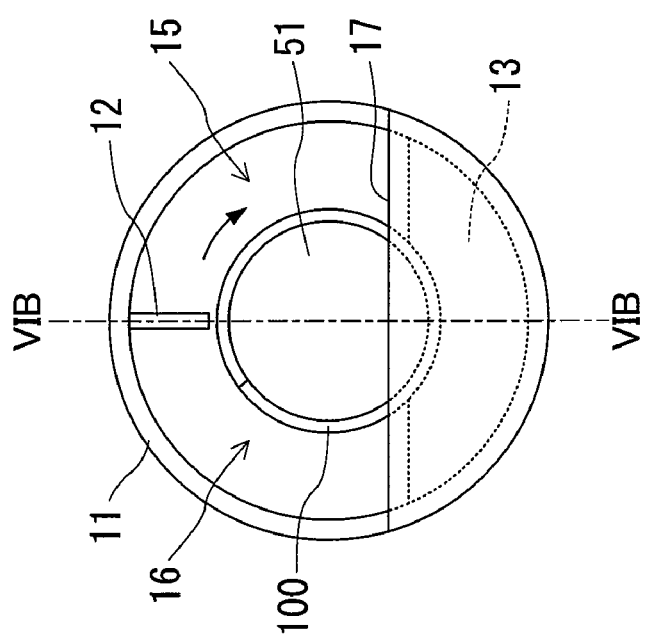
Fig. 6B
Fig. 6A

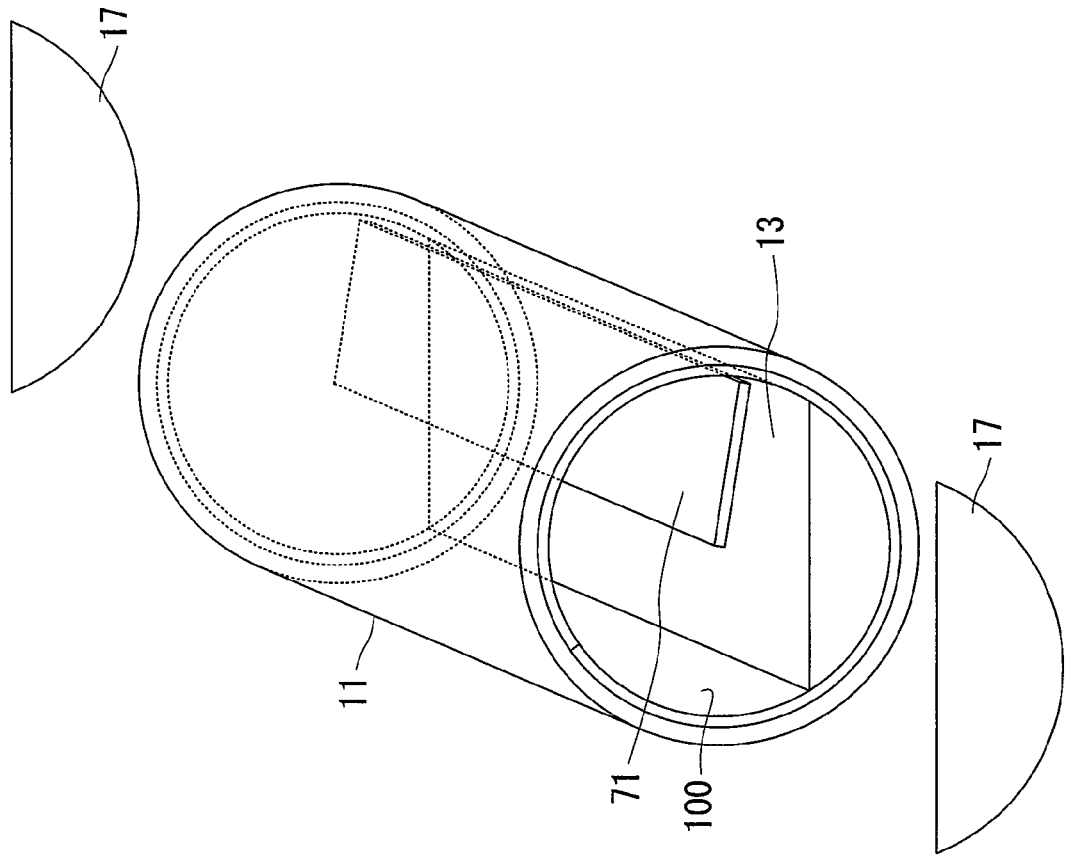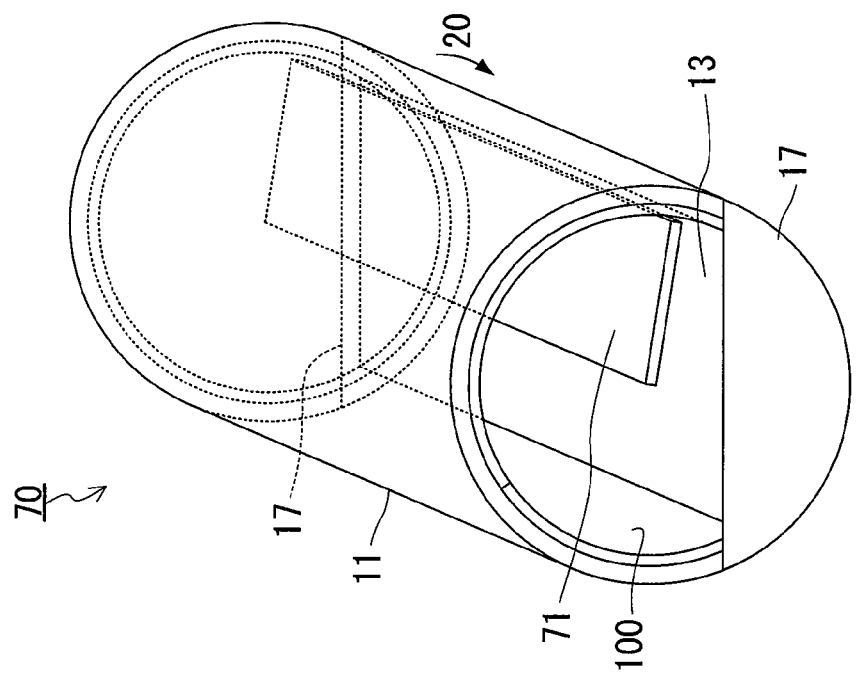
Fig. 7A
Fig. 7B

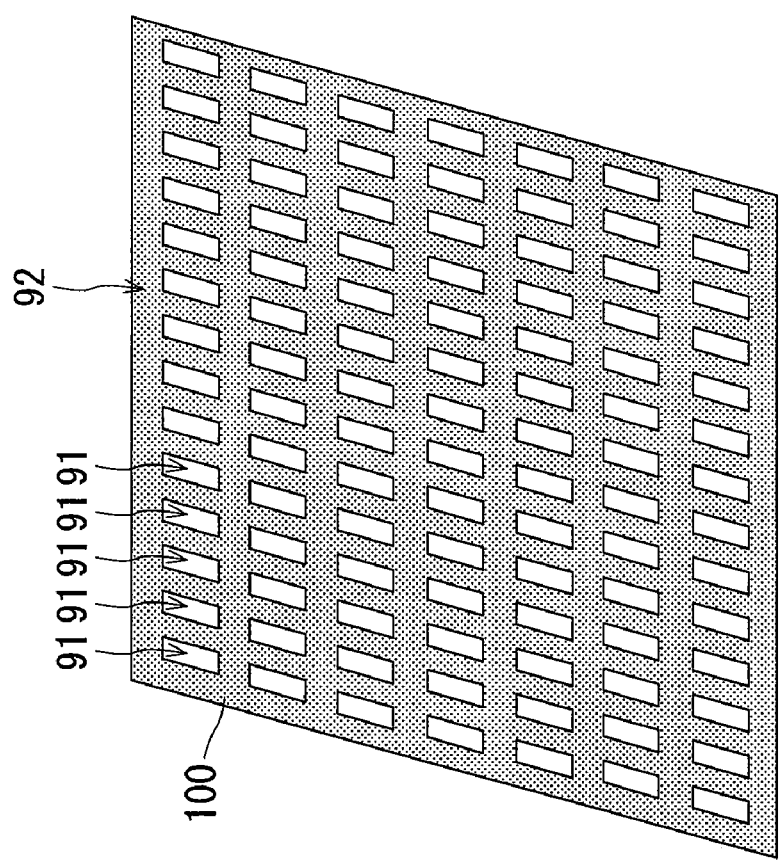
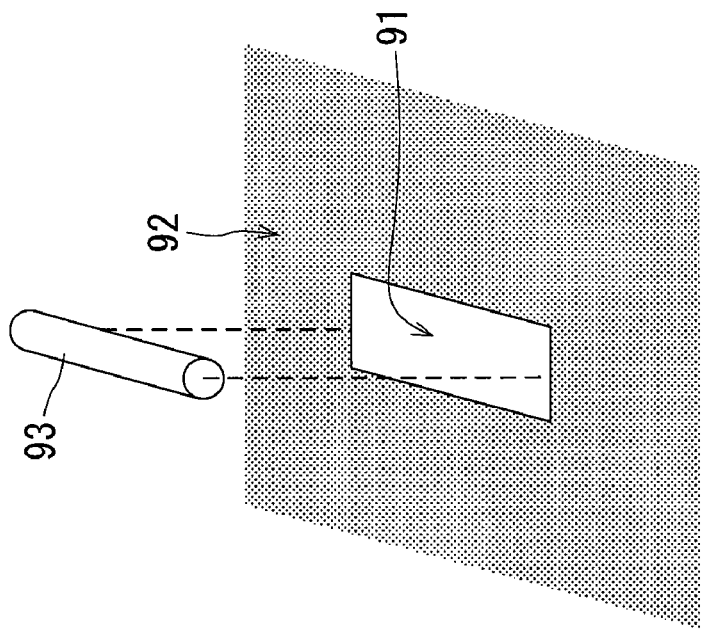
Fig. 9A
Fig. 9B

PARTICLE ARRANGEMENT APPARATUS AND PARTICLE ARRANGEMENT METHOD

RELATED APPLICATIONS

This Application is a continuation of International Application No. PCT/JP2007/071127, whose international filing date is Oct. 30, 2007, which in turn claims the benefit of Japanese Patent Application No. 2006-305226, filed on Nov. 10, 2006, the disclosures of which Applications are incorporated by reference herein. The benefit of the filing and priority dates of the International and Japanese Applications is respectfully requested.

BACKGROUND OF THE INVENTION

1. Field of the Invention

The present invention relates to a particle arrangement apparatus and a particle arrangement method.

2. Description of the Related Art

Recently, research and development has been carried out actively for obtaining electronic devices that use fine particles (nanocomponents) whose one side is smaller than 1 μm. A field-effect transistor (FET) using semiconductor nanowires for channels has been disclosed as an example of the electronic devices that utilize nanocomponents (D. Wang, et al., "Germanium nanowire field-effect transistors with $SiO_2$ and high-k $HfO_2$ gate dielectric", Appl. Phys. Lett., Vol. 83, pp. 2432, 2003). The nanocomponents such as semiconductor nanowires can be arranged on a substrate by coating. Therefore there is a possibility that the semiconducting devices that use nanocomponents may be produced at low cost as compared to conventional semiconducting devices that are formed using a large-sized vacuum deposition apparatus.

In order to obtain a transistor that uses columnar nanocomponents, it is necessary to connect a source electrode to one end of each nanocomponent and a drain electrode to the other end. To do so, nanocomponents need to be uniaxially oriented and arranged in a channel region of the transistor. Accordingly, in order to form a field-effect transistor using nanocomponents by the coating method, it is necessary to establish a production technique for orienting and arranging nanocomponents in a specific region.

A method, in which liquid passages are formed for a liquid to flow at the substrate surface and a liquid containing nanocomponents dispersed therein is passed through the liquid passages, has been reported as a method of controlling the direction in which the nanocomponents are oriented and the position where they are arranged (Y. Huang, et al., "Directed Assembly of One-Dimensional Nanostructures into Functional Networks,", Science, vol. 291, pp. 630, 2001, and U.S. Pat. No. 6,872,645). In this method, a liquid containing nanocomponents dispersed therein is passed and thereby columnar nanocomponents are oriented and applied onto the substrate. The liquid passages located at the substrate surface are formed with a polydimethylsiloxane mold having a large number of fine grooves formed at the surface thereof that is brought into contact with the substrate.

Another method also has been reported (U.S. Pat. No. 6,969,690). In this method, a suspension containing nanocomponents whose surfaces have been rendered hydrophilic is prepared first. Next, a substrate with a surface, a part of which has been rendered hydrophilic, is brought into contact with the suspension. Thereafter, the suspension is separated from the substrate. It has been reported that in this stage, the utilization of the interfaces of solid/liquid/gas between the substrate, suspension, and air allows the nanocomponents to be oriented to a certain degree and to be placed in the hydrophilic portion of the substrate. Furthermore, a method of dipping a part of a substrate into a suspension and gradually evaporating the solvent of the suspension has been reported as a method of separating the suspension from the substrate.

However, in the method of Y. Huang and a method described in U.S. Pat. No. 6,872,645, a mold with a microstructure is used and therefore there is a problem in that nanowires are difficult to arrange on a large area substrate.

Furthermore, in the method described in U.S. Pat. No. 6,969,690, in order to increase the density at which the nanocomponents are arranged, it is necessary to pull up the substrate very slowly. Therefore this method is not suitable for mass production, which is a problem. Moreover, in this method, the center and the end faces of a substrate tend to be different from each other in density at which the nanocomponents are arranged, and therefore it is difficult to uniformly apply the nanocomponents to the whole substrate surface, which is a problem.

Furthermore, in the conventional method described above, a large amount of dispersion is required and thereby the production cost increases, which is a problem.

SUMMARY OF THE INVENTION

With the aforementioned situations in mind, an object of the present invention is to provide a new arrangement apparatus for arranging particles such as nanocomponents on a substrate. Furthermore, another object of the present invention is to provide a new arrangement method for applying particles to a substrate.

In order to achieve the aforementioned objects, a particle arrangement method of the present invention for arranging particles on a substrate includes: (i) arranging a dispersion of the particles in a part inside a container, (ii) applying a liquid different from the dispersion to a surface of the substrate, (iii) rotating the substrate inside the container to dip the substrate into the dispersion and removing the substrate from the dispersion and thereby arranging the particles on the substrate.

The particle arrangement apparatus of the present invention is a particle arrangement apparatus for arranging particles on a substrate and includes: a container for holding a dispersion of the particles, a rotating means for rotating the substrate inside the container to dip the substrate into the dispersion and to remove the substrate from the dispersion, and a coating means for applying a liquid different from the dispersion to a surface of the substrate when the substrate is not in contact with the dispersion.

In the apparatus and method of the present invention, rotation of the substrate inside the container makes it possible to repeatedly dip the substrate into a dispersion of particles and remove the substrate from the dispersion. Accordingly, the present invention allows particles to be arranged over the whole substrate uniformly with high density. Furthermore, in the apparatus and method of the present invention, a smaller amount of dispersion of particles is required as compared to the conventional dip method. Moreover, in the apparatus and method of the present invention, a larger space is provided in the container, so that particles can be arranged on a large area substrate.

In the apparatus and method of the present invention, formation of a lyophobic region and a lyophilic region on the substrate surface makes it possible to orient and arrange particles in a specific region.

BRIEF DESCRIPTION OF THE DRAWINGS

FIG. 2A is a plan view of a particle arrangement apparatus; and FIG. 2B is a cross-sectional view thereof.

FIG. 6A is a plan view of the particle arrangement apparatus shown in FIG. 5; and FIG. 6B is a cross-sectional view thereof.

FIG. 7A is a perspective view that schematically shows another example of the particle arrangement apparatus of the present invention; and FIG. 7B is an exploded perspective view thereof.

FIG. 9A is a perspective view of an example of the substrate used in the present invention; FIG. 9B is a schematic view showing the relationship between the shape of a lyophilic region and that of a silicon nanowire.

BEST MODE FOR CARRYING OUT THE INVENTION

Figure 1B:
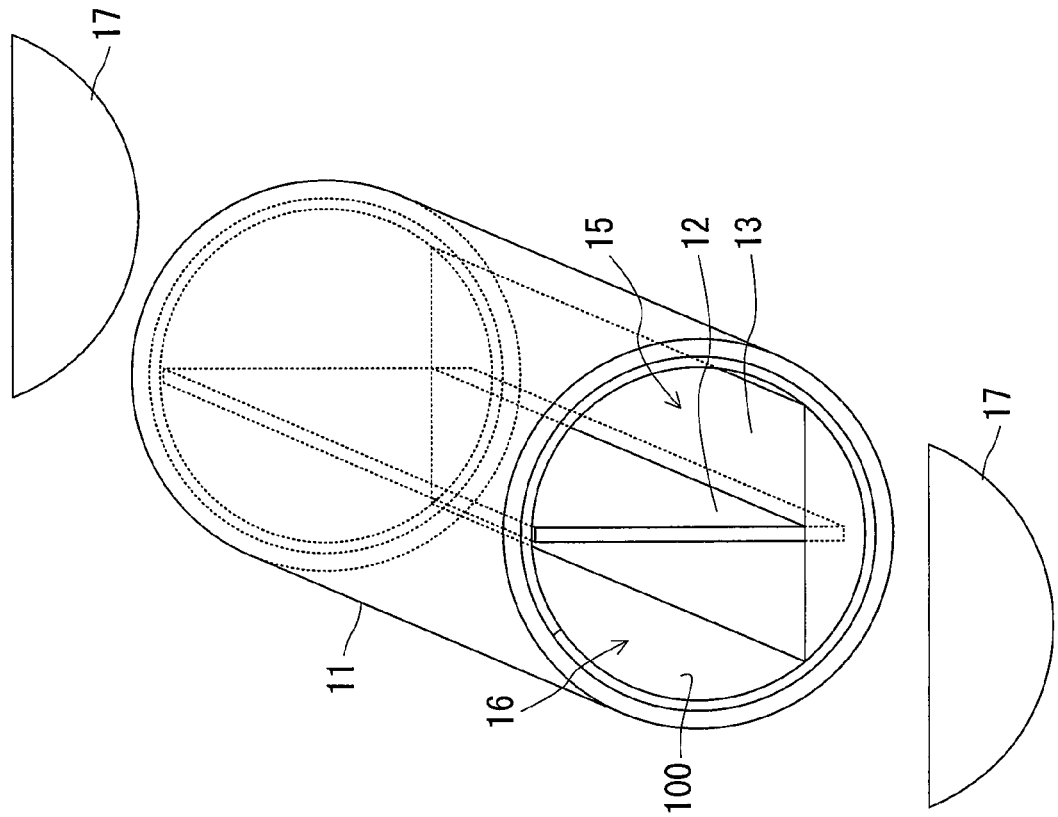
FIG. 1B is an exploded perspective view thereof.

Hereinafter, embodiments of the present invention are described. However, the present invention is not limited to the descriptions of the following embodiments. In the following descriptions, specific numerical values and specific materials may be indicated as examples but other numerical values and materials may be used as long as the effects of the present invention can be obtained.

[Particle Arrangement Apparatus]

The particle arrangement apparatus of the present invention is an apparatus for arranging particles (hereinafter may be referred to as "particles (A)") on a substrate. This apparatus includes a container, a rotating means, and a coating means. The container holds a dispersion of the particles (A). The rotating means rotates the substrate inside the container to dip the substrate into the dispersion and to remove the substrate from the dispersion. The coating means applies a liquid (hereinafter may be referred to as "liquid (B)") different from the dispersion to the surface of the substrate when the substrate is not in contact with the dispersion.

The particles (A) are fine particles with a longest side of 1 mm or less, for example, fine particles with a longest side of less than 1 μm (hereinafter may be referred to as "nanocomponents"). Examples of the nanocomponents include metal particles, semiconductor particles, and insulator particles, each of which has a spherical shape or a shape similar thereto, as well as semiconductor nanowires and carbon nanotubes, each of which has a columnar shape or a shape similar thereto. The "nanowire" denotes a wire-like object with a length of less than 1 μm. Examples of the semiconductor nanowires include silicon nanowires, germanium nanowires, and gallium arsenide nanowires. The particles (A) may be, for example, silicon nanowires.

The liquid (B) is preferably a liquid that has a higher wettability (affinity) to particles (A) than that of the dispersion medium of the dispersion. This allows the particles (A) contained in the dispersion to be taken into the liquid (B) applied to the substrate surface. The liquid (B) generally is a liquid containing water, for example, a liquid containing water at a content ratio of at least 50 mass %, and typically is water. In the following description, the case where the liquid (B) is water may be described, but the liquid (B) may be a liquid other than water.

The dispersion medium of the dispersion is a liquid in which the liquid (B) substantially does not dissolve, specifically, a liquid in which the solubility of the liquid (B) is low. For example, the dispersion medium of the dispersion is a liquid in which the solubility of the liquid (B) (weight of the liquid (B) that is dissolved in 100 ml of dispersion medium) at 25° C. is 10 g or less (preferably 1 g or less). In a typical example, the liquid (B) is water, and the solubility of water in the dispersion medium of the dispersion at 25° C. is 10 g or less (preferably 1 g or less). Examples of such a dispersion medium include a chlorinated solvent such as chloromethane, dichloromethane, chloroform, carbon tetrachloride, monochlorobutane, dichlorobutane, monochloropentane, or dichloropentane, or alkane such as hexane, peptane, octane, nonane, decane, undecane, dodecane, tridecane, tetradecane, pentadecane, hexadecane, toluene, or xylene.

The particle arrangement apparatus is not particularly limited in its form as long as it can arrange the dispersion of the particles (A). The container may be one having a columnar space therein. The outer shape of the container is not limited and may be, for example, columnar or prismatic. The shape of the columnar space may be a column or an elliptical column. Furthermore, the shape of the columnar space may be prismatic. An example of the columnar shape is one defined as follows. That is, suppose simple closed curves C1 and C2 are given on two parallel planes, and a straight line parallel to a certain straight line L extends between each point located on the curve C1 and each point located on the curve C2. In this condition, a closed curved surface formed of two end faces surrounded by the curves C1 and C2 and a side face formed of all the line segments that extend between the respective points of the curves C1 and C2 has a columnar shape. In this specification, the straight line that passes through the two end faces may be referred to as an "axis of a columnar shape" or an "axis of a columnar space". When the curves C1 and C2 each are a circle, the columnar shape is a column. When the curves C1 and C2 each are ellipse, the columnar shape is an elliptical column. Furthermore, the length of the longest line segment among the line segments whose both ends are in contact with the curve C1 (or C2) is defined as the largest diameter of the column.

Hereinafter, the coating means is described using two examples. A first coating means includes a partition plate and an apparatus for controlling the relative humidity inside a tank. The partition plate divides the columnar space except the dispersion inside the container into a first region and a second region along the direction of the axis of the columnar space. The humidity of the first region is increased and thereby water is applied to the surface of the substrate. For example, the relative humidity in the first region is set to be at least 80% (for example, at least 90%), which allows water to be applied to the surface of the substrate located in the first region. In this case, the relative humidity of the first region is controlled so that the dew point of water vapor is higher than the temperature of the substrate. Furthermore, the relative humidity of the second region is set to be lower than 80% (for example, lower than 60%), which allows the dispersion medium of the dispersion (and the liquid (B)) that has adhered to the substrate to be removed easily in the second region. In one example, the relative humidity of the first region is set at 80% or higher, and that of the second region at lower than 40%. The partition plate may be any one as long as the gas inside the first region and that inside the second region can be separated substantially from each other. It does not need to separate the first region and the second region completely from each other. For example, a slight gap may be present between the partition plate and the container inner wall.

The humidity of the spaces divided with the partition plate can be controlled by placing a vapor generator inside the container or introducing gas, which has a predetermined humidity and has been generated outside the container, into the container. In such a case, the coating means includes the vapor generator. When the liquid (B) is a liquid other than water, the coating means includes an apparatus for controlling the partial pressure of the liquid (B) inside the tank.

The second coating means applies the liquid (B) to the substrate, with the liquid (B) being not made into gas but remaining as a liquid. The second coating means includes, for example, a squeegee. For the squeegee, for example, a plate-like member (for instance, a plate-like member with a knife-like edge) can be used.

The edge of the squeegee is placed at a fixed interval so as to be parallel to the substrate surface, and the liquid (B) is placed between the edge of the squeegee and the substrate. The liquid (B) is formed into a curtain-like liquid film between the edge of the squeegee and the substrate. The squeegee is fixed and the substrate surface moves in the liquid film part as the substrate rotates inside the container. As a result, the liquid (B) is applied to the substrate. Desirably, the coating means is provided with an apparatus for continuously feeding the liquid (B) between the squeegee and the substrate. This allows the liquid film to be always present between the squeegee and the substrate and thereby the liquid (B) to be applied to the substrate continuously.

The liquid (B) may be applied to the substrate only during the early stage of the step of arranging the particles (A), while the substrate may be dried only during the final stage of the step of arranging the particles (A). In this configuration, after the liquid (B) is allowed to adhere to the substrate, a step of dipping the substrate into the dispersion is carried out once or a plurality of times, and the substrate is finally dried. In this configuration, the partition plate can be omitted. For instance, the container is allowed to have a high humidity atmosphere (with, for example, a relative humidity of at least 80% or at least 90%) therein during the early stage of the step of arranging the particles (A), while being allowed to have a low humidity atmosphere (with, for example, a relative humidity of lower than 80% or lower than 40%) therein during the final stage of the step of arranging the particles (A).

Furthermore, the coating means may be one other than the two examples described above as long as it allows the liquid (B) to be applied to the substrate. For instance, the coating means may be an ink-jet apparatus, a relief printing machine, or an intaglio printer.

In the above description of the coating means, the case where the liquid (B) is water is described. However, the liquid (B) may be a liquid other than water.

The rotation axis of the substrate may be arranged so as to form an angle of 45° to 90° (for example, 75° to 90°) with respect to the direction of gravity. When the substrate is rotated in this manner, the substrate can enter and exit the dispersion located at the bottom of the container.

In an example of the apparatus, the substrate is fixed to the inner wall of the container in such a manner that the principal surface thereof, on which the particles (A) are to be arranged, faces the center of the container. The fixation can be performed using a known fixing means. For example, the substrate may be fixed mechanically using a jig or may be fixed using an adhesive. When the substrate is one with flexibility, such as a resin substrate or a thin metal substrate, it can be bent and fixed along the shape of the inner wall of the container.

The number of substrates to be fixed inside the container is not limited and may be one or more. Furthermore, the whole wall surface inside the container may be covered with the substrate or the substrate may be fixed to only a part of the wall surface. When the inside of the container is a columnar space and the substrate is a rectangular substrate with flexibility, the substrate can be bent and fixed along the inner wall surface of the container. In this case, desirably, the substrate is allowed to adhere closely to the inner wall surface, so that the dispersion is prevented from entering between the substrate and the inner wall surface inside the container. Moreover, when the inside of the container is a prismatic (for instance, quadrangular to octangular prisms) space, one substrate may be disposed on each planar side wall.

The rotating means includes, for example, a motor, a gear, a belt, a shaft, and a substrate fixing means as required. The rotating means has various configurations according to the fixation state of the substrate. For example, when the substrate has been fixed to the inner wall of the container in the columnar space, the rotating means may rotate both the inner wall of the container and the substrate. In this case, the substrate may be bent and fixed along the inner wall of the container. Furthermore, in this case, the whole container may rotate around the axis of the columnar space, or the inner wall alone of the container may rotate rather than the outer portion. When the substrate is not fixed to the container, the rotating means may rotate the substrate independently of the container.

The rotating means rotates the substrate around the axis of the columnar space inside the container. When the shape of the columnar space is a column, the substrate is rotated around the central axis of the column and thereby the surface of the dispersion can be prevented from being disturbed due to the movement of the substrate, which makes it easy to arrange the particles (A) uniformly on the substrate.

The volume of the dispersion is less than that of the inner part of the container and may be 50% or less (for example, 20% or less) of the volume of the inner part of the container.

[Particle Arrangement Method]

The particle arrangement method of the present invention can be carried out easily by using a particle arrangement apparatus of the present invention. The items described with respect to the particle arrangement apparatus of the present invention can be applied to the following particle arrangement method. Accordingly, with respect to the items described above, the same description may not be repeated. Conversely, the items described with respect to the following particle arrangement apparatus can be applied to the particle arrangement apparatus of the present invention.

The particle arrangement method of the present invention includes the following steps (i) to (iii). In step (i), a dispersion of particles (A) is placed in a part inside the container.

In step (ii), a liquid (B) that is different from the aforementioned dispersion is applied to the surface of a substrate. The liquid (B) can be applied using the aforementioned coating means.

In step (iii), the substrate is rotated inside the container to be dipped into the dispersion and to be removed from the dispersion and thereby the particles (A) are arranged on the substrate. Thus the particles (A) are arranged on the substrate.

The surface of the substrate that has been subjected to step (iii) has a liquid that has adhered thereto. This liquid is the liquid (B) and the dispersion medium contained in the dispersion. By removing the liquid from the substrate surface, the particles (A) adhere to the substrate surface. The method of removing the liquid is not limited. It may be removed by, for example, air drying or reducing the partial pressure of the liquid (B) (or humidity when the liquid (B) is water) in the atmosphere. In the method of the present invention, the substrate removed from the dispersion may be dried inside the container.

The wettability of the particles (A) to the liquid (B) is preferably higher than that of the particles (A) to the dispersion medium of the dispersion. This allows the particles (A) contained in the dispersion to be taken into the liquid (B) that has been applied to the substrate surface.

In the method of the present invention, steps (ii) and (iii) may be repeated a plurality of times. With the substrate being rotated in the container, dipping of the substrate into the dispersion and removal thereof from the dispersion are repeated. In this case, step (ii) is carried out before the substrate is dipped into the dispersion (including the case where the substrate is dipped into the dispersion again after being removed from the dispersion), which allows steps (ii) and (iii) to be repeated. In this case, the number of repetition of step (ii) may be fewer than that of step (iii). For example, after step (ii) is carried out once, step (iii) may be carried out a plurality of times and the substrate may be finally dried.

The method of the present invention is useful for orienting and arranging nanocomponents (for example, silicon nanowires) in a fixed direction on a predetermined place of a flexible substrate, with the nanocomponents having a columnar shape or a shape similar thereto. In the method of the present invention, it is preferable that a lyophilic region (hereinafter may be referred to as a "first region") and a lyophobic region (hereinafter may be referred to as a "second region") surrounding the lyophilic region be formed in predetermined places of the substrate. In this case, the surface energy of the first region is set to be higher than that of the second region.

The shape of the lyophilic first region is set to be equal to or larger than that of the maximum projection plane among projection planes of the nanocomponents. When the columnar nanocomponents (for instance, silicon nanowires) are oriented and arranged in one direction, it is preferable that the first region be rectangular and the length of its short side be shorter than that of the long side of each nanocomponent.

The lyophilicity of the first region and the liquid repellency of the second region also relate to the surface energy of the regions. Preferably, the surface energy of the first region is higher than that of the second region. Specifically, it is preferable that the surface energy of the second region be at least 5 mJ/m$^2$ but lower than 40 mJ/m$^2$ (preferably in the range of 5 to 25 mJ/m$^2$) and the surface energy of the first region be at least 40 mJ/m$^2$ (preferably in the range of 60 to 1000 mJ/m$^2$).

The second region can be formed by disposing an organic film that has lower wettability with respect to, for example, water than that of the first region. This method allows the first and second regions to be formed easily.

In the method of the present invention, the wettability of the particles (A) to the liquid (B) (for instance, water) is higher than that to the dispersion medium of the dispersion. In order to increase the wettability of the particles (A) to the liquid (B) such as water, the surfaces of the particles (A) may be modified chemically with organic molecules.

Whether the wettability of the surfaces of the particles (A) to water is higher than that to the dispersion medium is determined by the combination of water, dispersion medium, and particles (A). For example, using the following method, the combination of the method of chemically modifying particles (A) and the dispersion medium can be determined. First, water whose volume is approximately equal to that of a dispersion of chemically modified particles (A) is placed in a test tube containing the dispersion. In this case, since water substantially is not dissolved in the dispersion medium, those two liquids are separated. Thereafter, the liquids inside the test tube are stirred and then allowed to stand. In this stage, when a part or most part of the particles (A) moves into water or to the interface of the water, this combination can be judged to be suitable.

For example, it also can be verified by the following method. The inner face of the test tube is chemically modified to have the same surface energy as that of the particles (A), the dispersion medium and water are placed inside the test tube, and the shape of the interface between the two liquids is observed. When water is present in the upper layer and the dispersion medium in the lower layer and the boundary therebetween has an upward convex shape, it can be assumed that the particles (A) have high wettability to water. Similarly, when water is present in the lower layer and the dispersion medium in the upper layer and the boundary between the two liquids has a downward convex shape, the particles (A) also can be considered to have high wettability to water. The above-mentioned two examples are described with respect to the case where the liquid (B) is water, but the similar method can be used even when the liquid (B) is another liquid.

Hereinafter, embodiments of the present invention are described using examples. In the following description, the similar parts are indicated with identical numerals and the same description may not be repeated.

Embodiment 1

Figure 1A:
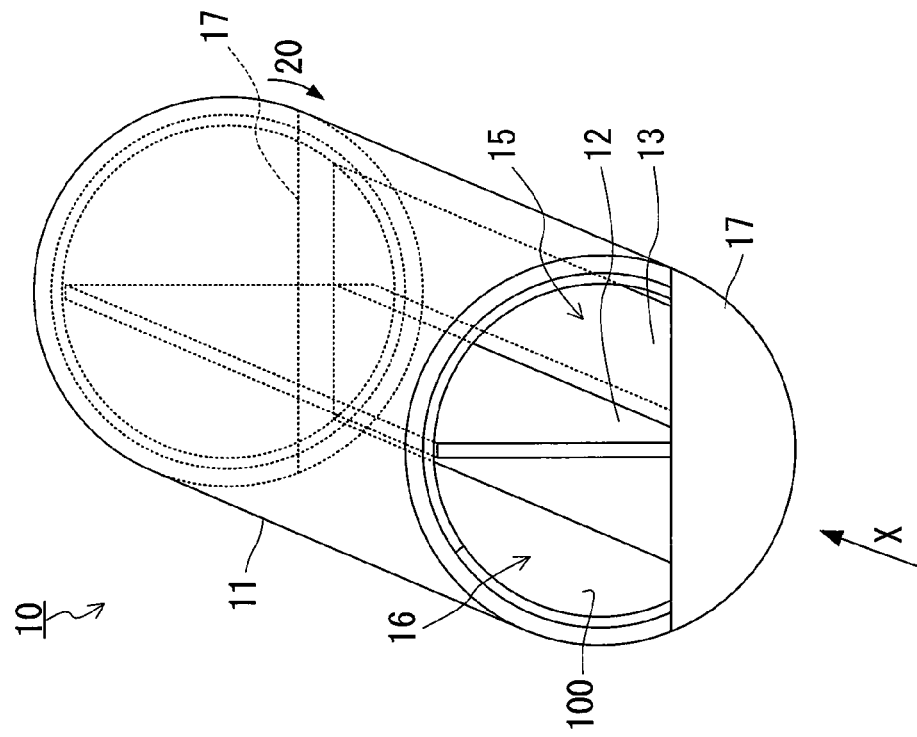
FIG. 1A is a perspective view that schematically shows an example of the particle arrangement apparatus of the present invention.

An example of the arrangement apparatus of the present invention is shown schematically in FIGS. 1A, 1B, 2A, and 2B. FIG. 1A is a perspective view, and FIG. 1B is an exploded perspective view. FIG. 2A is a diagram of an arrangement apparatus 10 shown in FIG. 1A viewed from the X direction, and FIG. 2B is a cross-sectional view taken on line IIB-IIB shown in FIG. 2A.

The arrangement apparatus 10 shown in FIG. 1A is an apparatus for arranging particles (A) on a substrate 100. The arrangement apparatus 10 includes a tank (container) 11, a mechanism (not shown) for fixing the substrate 100 to the inner wall of the tank 11, a partition plate 12, and a mechanism (not shown) for rotating the substrate 100. A dispersion 13 of the particles (A) is placed inside the tank 11. The partition plate 12 divides the internal space of the tank 11 excluding the dispersion 13 into a first space 15 and a second space 16. The mechanism for rotating the substrate 100 includes a motor for rotating the tank 11. This mechanism rotates the tank 11 to rotate the substrate 100. The substrate 100 rotates as if moving along the peripheral surface of a column having a fixed radius.

Figure 3B:
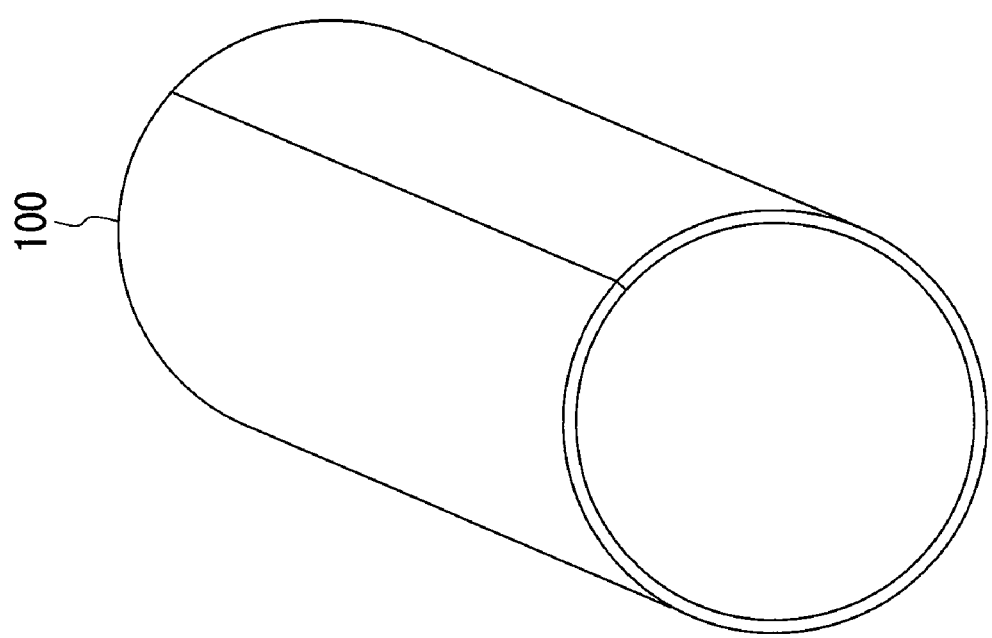
FIG. 3B is a perspective view thereof.
Figure 3A:
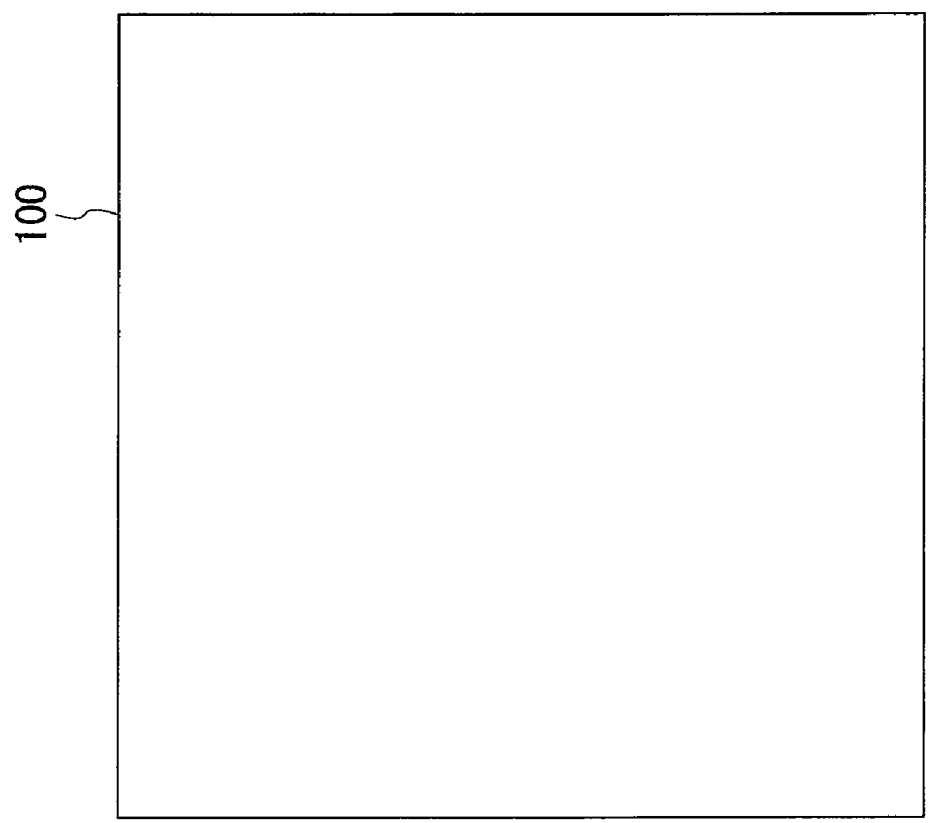
FIG. 3A is a plan view that schematically shows an example of the substrate used in the present invention.

Embodiment 1 shows the case where the tank 11 has a cylindrical shape. The tank 11 is disposed in such a manner that the central axis of the cylindrical tank 11 is perpendicular to gravity. If the substrate 100 to be attached to the inner wall of the tank 11 is a square of 180 cm×180 cm and is a flexible substrate with a thickness of approximately 0.5 mm, and the tank 11 has an inner diameter of 57.3 cm and a length of 180 cm, the substrate 100 can be rolled up cylindrically to be fixed to the inner wall of the tank 11. FIG. 3A is a plan view of the substrate 100, and FIG. 3B shows the state of the substrate 100 that has been rolled up cylindrically. When 53 liters of dispersion is placed in the tank 11, the height from the bottom of the inner wall of the tank 11 to the surface of the dispersion is 9.6 cm.

In order to prevent the dispersion 13 from spilling out of the tank 11, two covers 17 are disposed at ends of the tank 11. In the apparatus 10, the tank 11 rotates around the central axis, with the partition plate 12 and the covers 17 being fixed. The tank 11 is joined to each of the covers 17 with a seal 18. When the tank 11 rotates, the tank 11 and the seals 18 slide over each other so that the dispersion does not leak. The tank 11 and the substrate 100 rotate toward the direction indicated with an arrow 20 shown in FIG. 1A. This rotation allows repetition of dipping of the substrate 100 into the dispersion 13 and removal of the substrate 100 from the dispersion 13.

Each cover 17 covers an end face of the tank 11 only partially and leaves a part of the end face open. The relative humidity of the first space 15 is set to be higher than that of the second space 16. The humidity of the spaces 15 and 16 may be adjusted with a gas generator provided inside the tank 11. The humidity of the spaces 15 and 16 also may be adjusted with humidity controlled gas introduced from the outside of the tank 11 into the inside thereof. For instance, the humidity controlled gas is introduced into the inside of the tank 11 from one open portion thereof and is discharged from the other open portion, so that the humidity of the spaces 15 and 16 may be controlled. In an example, gas with a relative humidity of 80% is introduced into the first space 15 and the temperature of the substrate 100 to be exposed to the first space 15 is set at the dew point or lower of the water vapor in the first space 15. For example, dry nitrogen is introduced into the second space 16. In this state, when the substrate 100 is rotated together with the tank 11, water droplets adhere to the surface of the substrate 100 in the first space 15. The substrate 100 to which the water droplets have adhered is then dipped into the dispersion 13. Thereafter, the substrate 100 to which the water droplets have adhered is removed from the dispersion 13 and is then dried in the second space 16. With rotation of the substrate 100, steps of applying water droplets to the substrate, dipping it into the dispersion 13, and removing it from the dispersion 13 and drying it are repeated.

The amount of the dispersion required in the apparatus 10 is compared to that of the dispersion required in the case of using the conventional dip method. Suppose the substrate has a size of 180 cm×180 cm and a thickness of 0.1 mm.

Figure 4B:
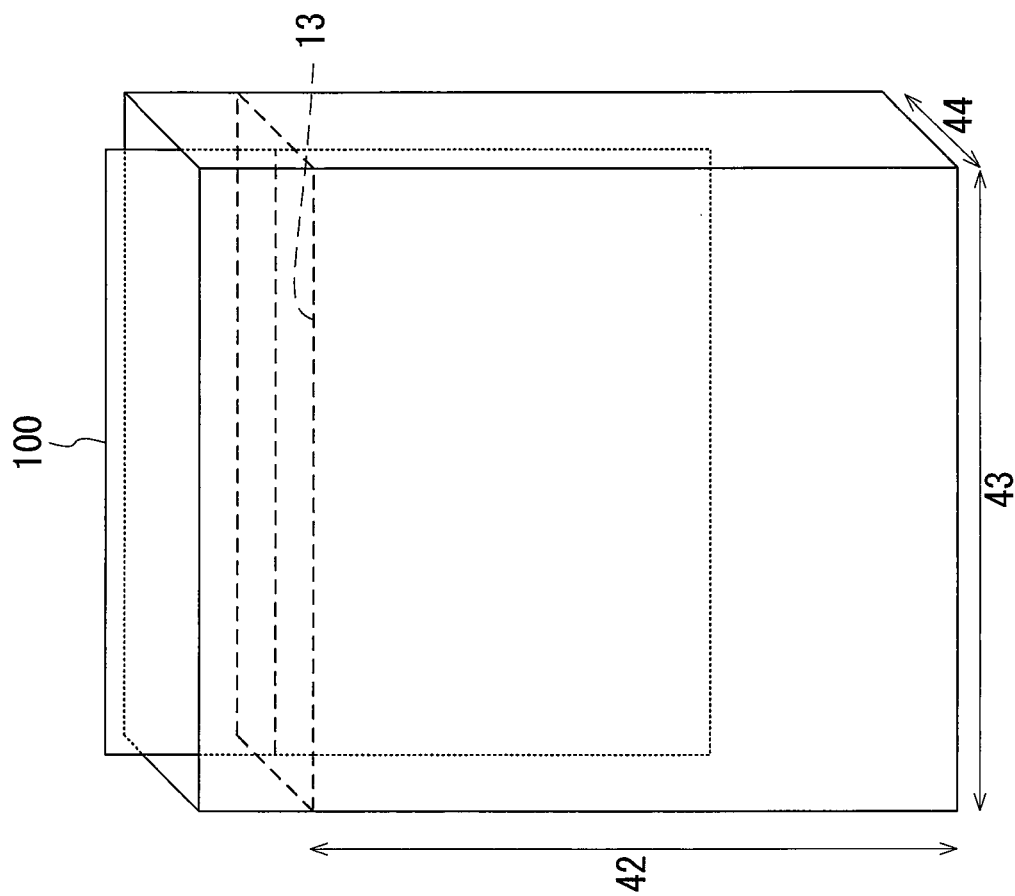
FIG. 4B is a schematic view showing a part of an apparatus used in the dip method.
Figure 4A:
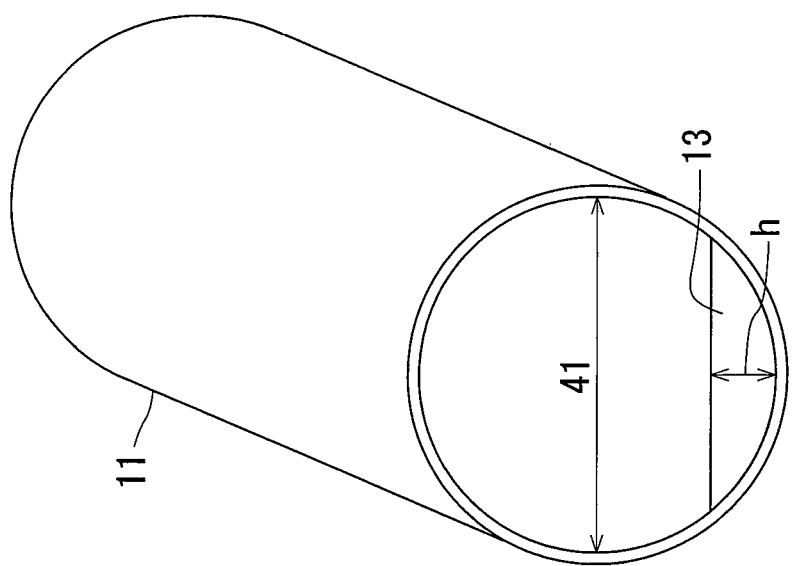
FIG. 4A is a schematic view showing a part of the particle arrangement apparatus of the present invention.

The tank 11 of the apparatus 10 is shown in FIG. 4A, and the manner of arranging particles by the dip method is shown schematically in FIG. 4B. In the apparatus 10, the tank 11 has an inner diameter 41 of 57.3 cm, and the substrate 100 is attached to the whole inner wall of the tank 11.

When the height h from the bottom of the inner wall of the tank 11 to the surface of the dispersion 13 is set at ⅙ (9.6 cm) of the inner diameter 41, the necessary amount of dispersion is 53 liters. On the other hand, in the dip method, when the height 42 and the width 43 of the dispersion 13 placed in the container are set to be equal to the size of the substrate 100, i.e. 180 cm, and the depth 44 is set at 9.6 cm, the necessary volume of dispersion is 311 liters. Accordingly, the necessary volume of dispersion in the apparatus 10 according to Embodiment 1 is approximately ⅕ of that required in the dip method.

Embodiment 2

Figure 5:
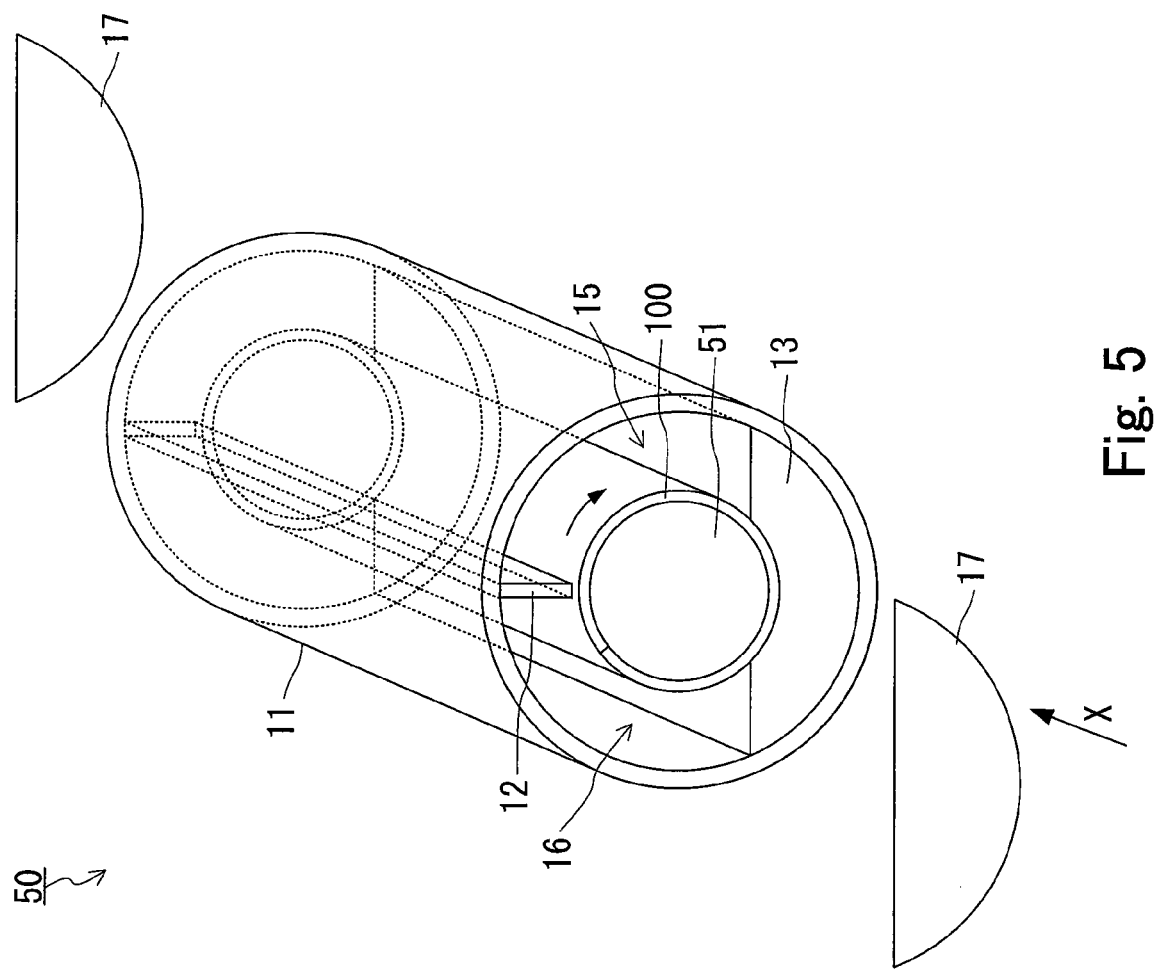
FIG. 5 is an exploded perspective view that schematically shows another example of the particle arrangement apparatus of the present invention.

Another example of the arrangement apparatus according to the present invention is shown schematically in FIGS. 5, 6A, and 6B. FIG. 5 is an exploded perspective view. FIG. 6A is a diagram of the arrangement apparatus 50 shown in FIG. 5 viewed from the X direction indicated in FIG. 5. FIG. 6B is a cross-sectional view taken on line VIB-VIB shown in FIG. 6A.

The arrangement apparatus 50 includes a tank 11, a partition plate 12, a substrate fixing member 51, and a mechanism (not shown) for rotating the substrate 100. A dispersion 13 of particles (A) is placed in a part inside the tank 11. The substrate 100 is fixed to be wound around the columnar substrate fixing member 51. That is, the substrate fixing member 51 fixes the substrate 100, with the substrate 100 being prevented from coming into contact with the inner wall of the tank 11. The partition plate 12 divides the space inside the tank 11 where the dispersion 13 is not present into a first space 15 and a second space 16.

The mechanism for rotating the substrate 100 includes a motor for rotating the substrate fixing member 51. This mechanism rotates the substrate fixing member 51 to rotate the substrate 100.

In the arrangement apparatus 50, the tank 11 is cylindrical and the substrate fixing member 51 is columnar. Two covers 17 are disposed at the ends of the tank 11 so as to prevent the dispersion 13 from spilling out of the tank 11.

In the arrangement apparatus 50, the substrate fixing member 51 can be rotated around the central axis thereof, with the tank 11, the partition plate 12, and the covers 17 being fixed. The tank 11, the covers 17, and the substrate fixing member 51 are joined together with seals 18 (see FIG. 6B). When the substrate fixing member 51 rotates, the seals 18 and the substrate fixing member 51 slide over each other so that the dispersion 13 does not leak.

The humidity of the first and second spaces 15 and 16 can be controlled by the methods described in Embodiment 1.

In the arrangement apparatus 50, when the substrate 100 is rotated together with the substrate fixing member 51, water droplets adhere to the surface of the substrate 100 in the first space 15. The substrate 100 to which the water droplets have adhered is then dipped into the dispersion 13. Thereafter, the substrate 100 to which the water droplets have adhered is removed from the dispersion 13 and is then dried in the second space 16. With rotation of the substrate 100, steps of applying water droplets to the substrate, dipping it into the dispersion 13, and removing it from the dispersion 13 and drying it are repeated.

In each apparatus of Embodiments 1 and 2, particles (A) are arranged on the substrate 100 by the following steps (1) to (3). (1) In the first space 15, water (liquid (B)) adheres to the surface of the substrate 100. Water adheres to the surface of the substrate 100 through dew condensation. Next, (2) the substrate 100 is dipped into the dispersion 13 and is removed from the dispersion 13. When the substrate 100 is dipped into the dispersion 13, the particles (A) contained in the dispersion 13 are taken into the water that has adhered to the substrate 100. This is because the state where the particles (A) are present in the water is energetically stable as compared to that where the particles (A) are present in the dispersion 13. Subsequently, (3) the substrate 100 removed from the dispersion 13 is dried and thereby water and the dispersion medium of the dispersion are evaporated. Thus, the particles (A) are arranged on the surface of the substrate 100. The repeated rotation of the substrate 100 allows the aforementioned steps (1) to (3) to be repeated. Although one dipping of the substrate 100 into the dispersion 13 may result in insufficient arrangement of the particles (A), the substrate 100 can be dipped into the dispersion 13 repeatedly in the present invention. Accordingly, the present invention allows the particles (A) to be arranged on the surface of the substrate 100 with high density.

The number of times the aforementioned steps (1) and (3) are carried out may be lower than that the aforementioned step (2) is carried out. For instance, first, step (1) of applying water to the whole surface of the substrate 100 may be carried out once, subsequently, the substrate 100 may be rotated a plurality of times and thereby step (2) may be carried out a plurality of times, and finally step (3) may be carried out once. When this method is used, the partition plate 12 can be omitted.

Embodiment 3

Figure 8:
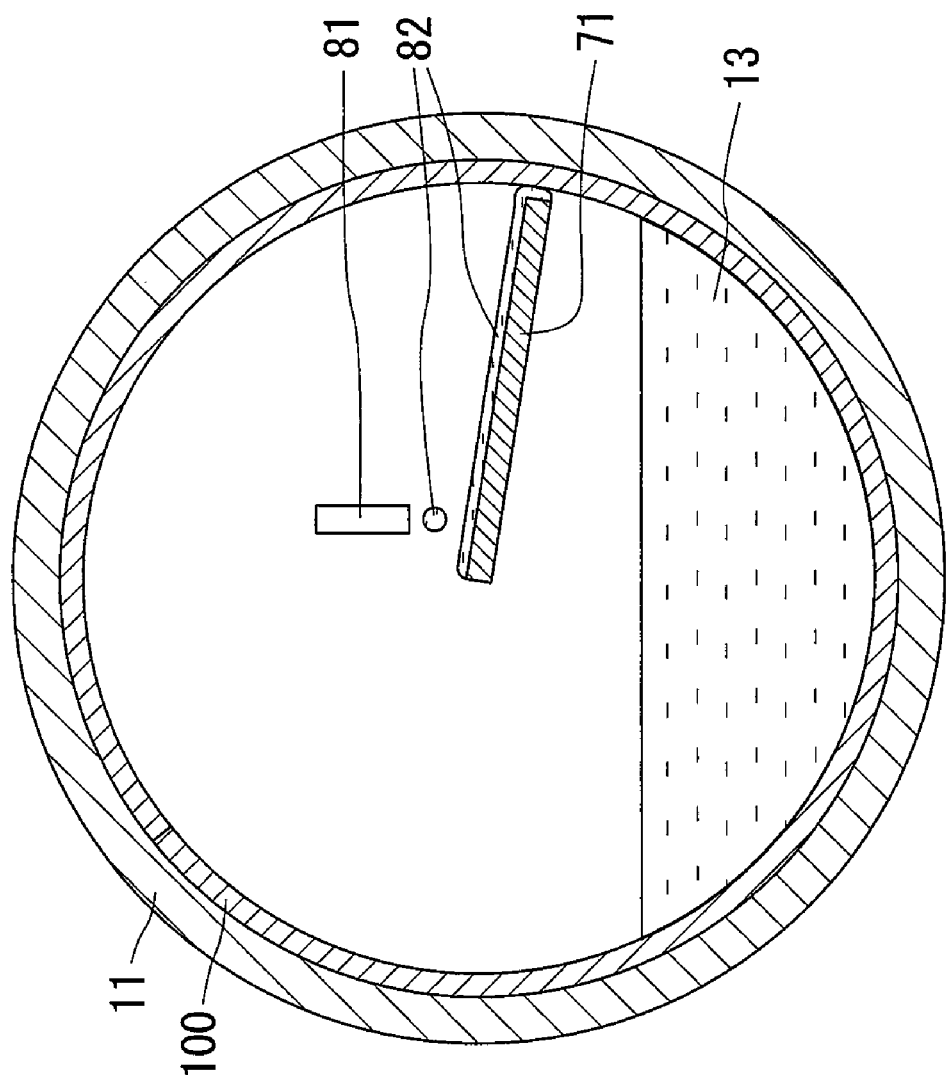
FIG. 8 is a cross-sectional view of the particle arrangement apparatus shown in FIG. 7.

Another example of the arrangement apparatus of the present invention is shown in FIGS. 7A, 7B, and 8. FIG. 7A is a perspective view, and FIG. 7B is an exploded perspective view. FIG. 8 is a cross-sectional view of the apparatus 70 shown in FIG. 7A. In FIGS. 7A and 7B, the water feed part 81 shown in FIG. 8 is omitted.

The apparatus 70 of Embodiment 3 is provided with a squeegee 71 and the water feed part 81 instead of the partition plate 12. When the liquid is to be removed from the surface of the substrate 100, the apparatus 70 has a dry atmosphere inside the tank 11.

The squeegee 71 is a plate-like member for applying water to the substrate 100. The squeegee 71 is placed at a fixed interval from the substrate 100 so that the side face of the squeegee 71 and the surface of the substrate 100 are parallel to each other. Thereafter, water 82 is fed between the side face of the squeegee 71 and the substrate 100 from the water feed part 81 (see FIG. 8). A curtain-like water film can be formed between the side face of the squeegee 71 and the substrate 100 through adjustments of the area of the side face of the squeegee 71, the wettability of water to the squeegee 71 and the substrate 100, the rotation speed of the substrate 100, and the distance between the side face of the squeegee 71 and the substrate 100.

The squeegee 71 is fixed. When the substrate 100 is rotated together with the tank 11, the surface of the substrate 100 moves while being in contact with the film of water 82. As a result, water 82 is applied to the substrate 100.

The water feed part 81 feeds water 82 continuously between the squeegee 71 and the substrate 100. The water feed part 81 is composed of a plurality of dispensers disposed to correspond to the area extending from one end to the other end of the squeegee 71. The plurality of dispensers are disposed at equal intervals. The squeegee 71 and the water feed part 81 allow water to be applied continuously to the substrate 100. Water may be fed into the water feed part 81 from the outside of the tank 11.

The material for the squeegee is not particularly limited. Squeegees made of, for example, glass, metal, or resin can be used. Among them, materials with high wettability to water are preferable, and, for example, glass, stainless steel, copper, and nylon resin are preferable. Furthermore, the shape of the squeegee is not particularly limited as long as it allows water to be applied to the substrate. For instance, a columnar or elliptical squeegee may be used, a squeegee whose shape is a polygonal prism such as a triangular prism, a quadrangular prism, or a pentagonal prism may be used, and a squeegee with a shape formed of a combination of a column and a polygonal prism may be used. Moreover, when a plate squeegee is used, a groove for holding a liquid may be formed at the side face thereof.

In the apparatus of Embodiment 3, particles (A) are arranged on the substrate 100 by the following steps (1) to (3). (1) Water (liquid (B)) is applied to the surface of the substrate 100 with the squeegee 71. Subsequently, (2) the substrate 100 is dipped into the dispersion 13 and is removed from the dispersion 13. When the substrate 100 is dipped into the dispersion 13, particles (A) contained in the dispersion 13 are taken into water that has adhered to the substrate 100. Next, (3) the substrate 100 removed from the dispersion 13 is dried and thereby the water and the dispersion medium of the dispersion are evaporated. Thus the particles (A) are arranged on the surface of the substrate 100. The repeated rotation of the substrate 100 allows the aforementioned steps (1) to (3) to be repeated. Thus, the present invention allows particles (A) to be arranged on the surface of the substrate 100 with high density.

The number of times the aforementioned steps (1) and (3) are carried out may be lower than that the aforementioned step (2) is carried out. For instance, first, step (1) of applying water to the whole surface of the substrate 100 may be carried out once, subsequently, the substrate 100 may be rotated a plurality of times and thereby step (2) may be carried out a plurality of times, and finally step (3) may be carried out once.

Embodiment 4

In Embodiment 4, an example of the method of arranging silicon nanowires on a substrate by using the arrangement apparatus described in Embodiment 1 is described. The arrangement apparatus described in Embodiment 2 also allows silicon nanowires to be arranged on a substrate by the same method as in Embodiment 4. Furthermore, the arrangement apparatus described in Embodiment 3 also allows silicon nanowires to be arranged on a substrate by the same method as in Embodiment 4 except for the method of applying water.

(1) Preparation of Substrate

As shown in FIG. 9A, a substrate 100 including lyophilic first regions 91 and a lyophobic second region 92 surrounding them is prepared. A flexible substrate is selected for the substrate 100. For instance, a resin substrate or a stainless steel substrate with a thickness of 0.01 to 0.1 mm is used.

FIG. 9B is a diagram that schematically shows the relationship between the shape of a lyophilic region 91 and that of a silicon nanowire 93. The region 91 is rectangle and the length of each long side thereof is approximately equal to or longer than the longitudinal length of the silicon nanowire 93. The length of each short side of the region 91 is shorter than the longitudinal length of the nanowire 93. The configuration as described above makes it possible to orient and arrange the nanowire 93 in the longitudinal direction of the region 91. In an example, the length of each long side of the region 91 is in the range of 0.7 times to twice (for example, 0.9 to 1.5 times) the longitudinal length of the nanowire 93, and the length of each short side of the region 91 is in the range of 0.03 to 0.7 times (for example, 0.03 to 0.3 times) the longitudinal length of the nanowire 93. For instance, when the silicon nanowire 93 has a diameter of 100 nm and a length of 10 μm, the size of the lyophilic region 91 may be 10 μm×2.5 μm. The number of the particles (A) to be arranged in one region 91 may be one or more.

In an example of Embodiment 4, one side of the rectangle substrate 100 is parallel to a long side of each region 91. Furthermore, a plurality of regions 91 are arranged in the grid pattern. In an example, the vertical interval between adjacent regions 91 is 200 μm and the horizontal interval between them is 7.5 μm.

The second region 92 can be formed by, for example, forming a film (hereinafter may be referred to as a "lyophobic film") with low wettability to a liquid (B) such as water, on the substrate 100. For example, a polymer film having fluoroalkyl chain, or a film formed of thiol molecules or a silane coupling agent having fluoroalkyl chain may be used as a lyophobic film formed of an organic material. Furthermore, an organic/inorganic hybrid film that is formed by the sol-gel process and has fluoroalkyl chain also may be used as the lyophobic film. These films each have a surface energy of approximately 20 mJ/m$^2$ and have a hydrophobic property.

Examples of the polymer having fluoroalkyl chain include polytetrafluoroethylene, polydifluoroethylene, and derivatives thereof. When a lyophobic film is formed with a silane coupling agent, the substrate may be dipped in a solution (whose solvent is chloroform, alkane, alcohol, or silicone oil) in which the silane coupling agent having fluoroalkyl chain has been dissolved at a concentration of several vol %, for a fixed period of time. In this case, after dipping, the substrate is washed with a solvent and thereby a monomolecular film can be formed.

In order to form those lyophobic films, it is preferable that active hydrogen be present at the surface of the substrate. Therefore, a treatment of washing the substrate with a surfactant, exposing the substrate to oxygen plasma, or exposing the substrate to an ozone atmosphere under UV light irradiation is carried out as required. Alternately, it also is possible to form a lyophobic film by forming a thin film of, for example, silicon oxide or silicon nitride on the substrate surface.

Figure 10:
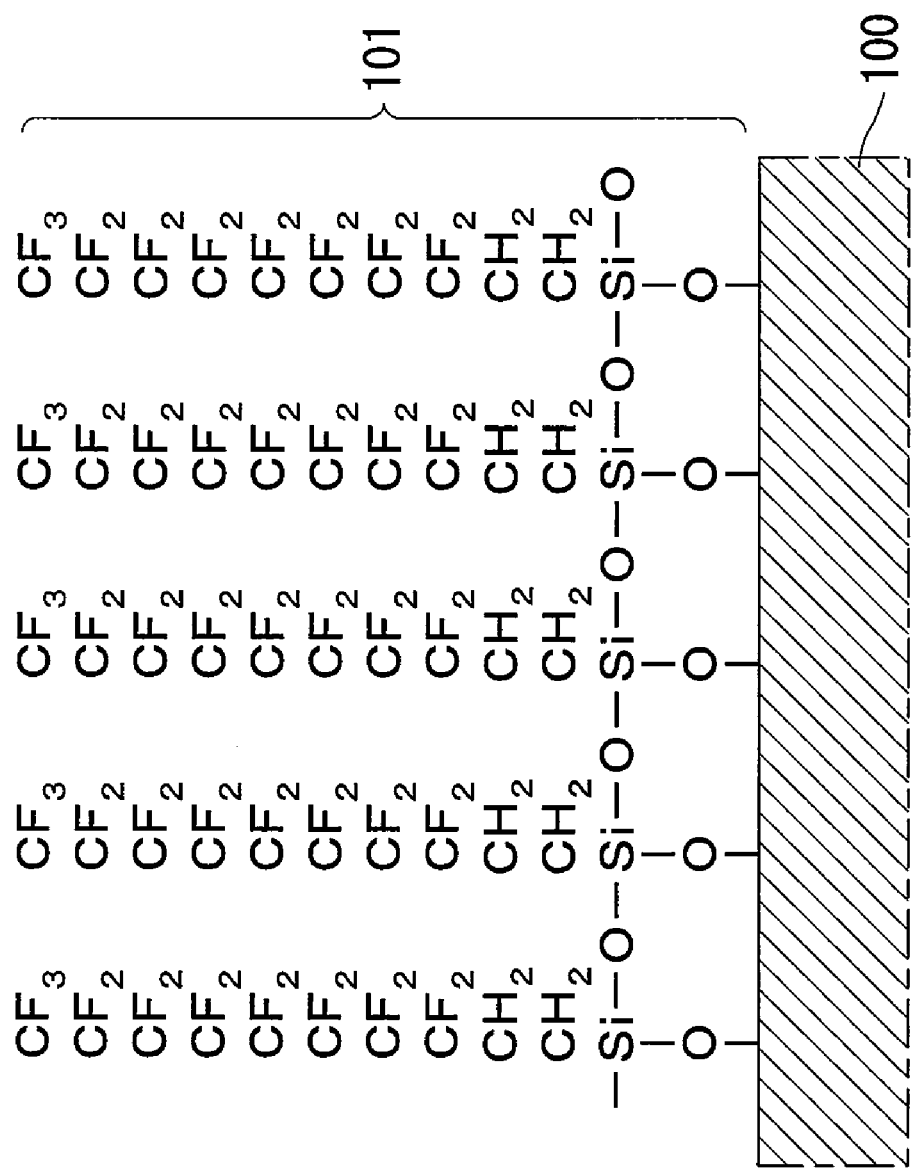
FIG. 10 is a schematic view showing an example of the lyophobic monomolecular film formed on a substrate.

FIG. 10 schematically shows the structure of an example of the lyophobic monomolecular film formed with a silane coupling agent. The monomolecular film 101 is bonded to the substrate 100 through predetermined bonds (Si—O).

Figure 11:
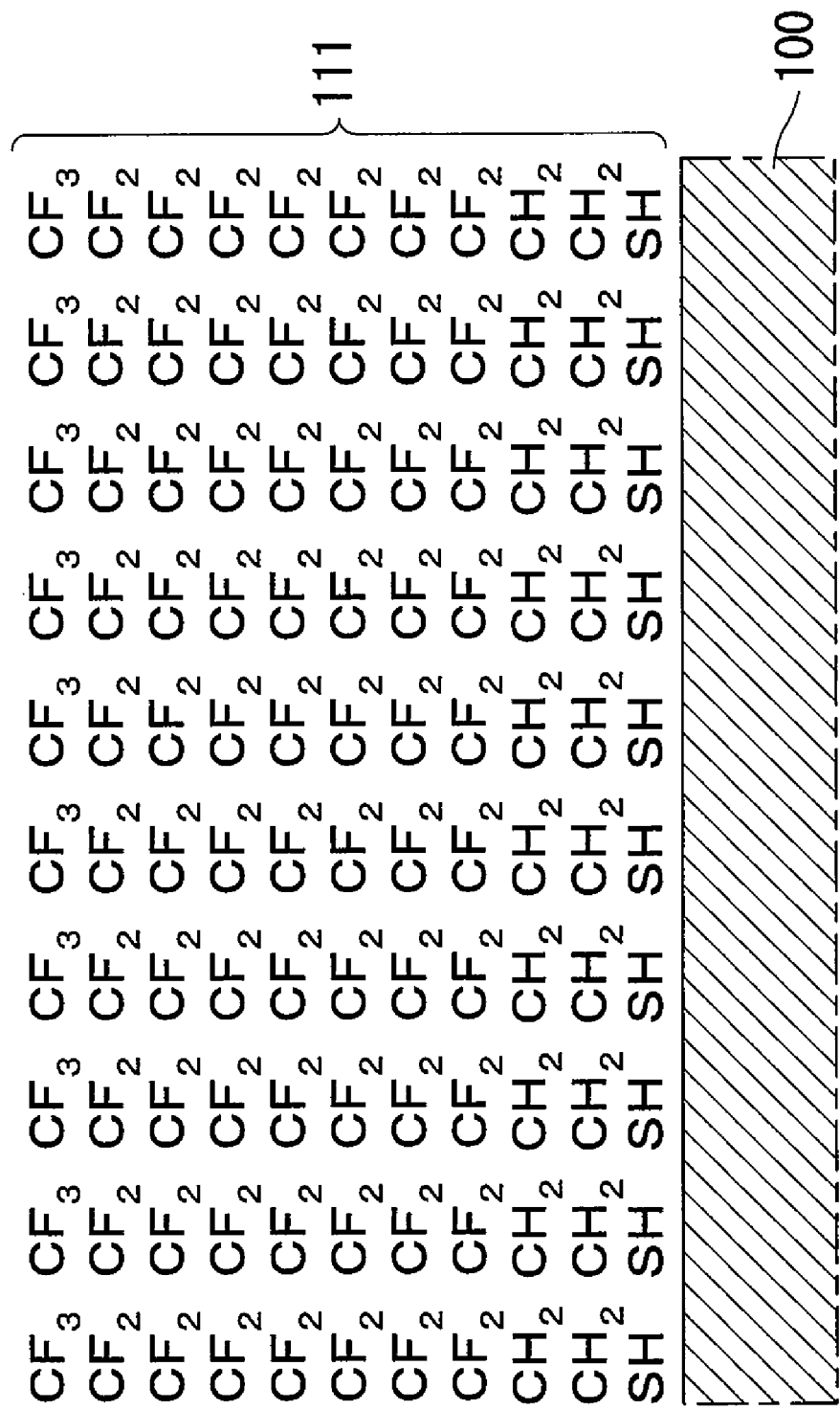
FIG. 11 is a schematic view showing another example of the lyophobic monomolecular film formed on a substrate.

When the lyophobic film is formed using thiol molecules, the substrate may be dipped into an ethanol solution or propanol solution in which thiol molecules having fluoroalkyl chain have been dissolved at a concentration of several vol %, for a fixed period of time, and the substrate is then washed with alcohol. Thus, a lyophobic monomolecular film is formed. Examples of the substrate that allows the monomolecular film to be formed include those made of metal such as gold, silver, or copper. FIG. 11 schematically shows the structure of an example of the lyophobic monomolecular film formed using thiol molecules. The monomolecular film 111 is bonded to the substrate 100 through SH groups.

When the lyophobic film is formed by the sol-gel process, for example, first, an alcohol solution, in which a precursor of silicon oxide, tetraethoxysilane, alkoxide having fluoroalkyl chain, an acid catalyst, and water have been dissolved, is applied to the substrate by the spin coat method or dipping method. Subsequently, the substrate is heat-treated at a temperature of at least 100° C. and thereby a lyophobic film can be formed. This lyophobic film can be formed on almost all substrates.

The first regions 91 surrounded by the second region 92 can be produced by preparing a lyophilic substrate or a substrate that has been treated to have lyophilicity beforehand, and forming a lyophobic film on a portion to serve as the second region 92. For instance, first, portions to be provided with lyophilicity of the surface of the substrate 100 are covered with a protective film such as a resist. Subsequently, the whole substrate 100 is covered with the lyophobic film, and the protective film is then removed and thereby the lyophobic film formed in the first regions 91 is removed. This method can be applied to the case where a lyophobic film is formed using a silane coupling agent or the sol-gel process.

A surface to which only the lyophobic film specifically adheres is formed in the portion to serve as the second region 92, and the lyophobic film may be formed in the portion alone. For instance, a metal pattern that reacts with thiol is formed beforehand in only a portion that is intended to be made lyophobic, and the substrate is dipped into the organic solvent containing thiol dissolved therein and thereby the metal pattern portion alone is allowed to be lyophobic.

Furthermore, a lyophobic film may be formed directly in a predetermined region by, for example, the ink-jet method, screen printing method, relief printing method, intaglio printing method, or micro contact printing method.

A specific method of producing a lyophobic region surrounding lyophilic regions by using a silane coupling agent is described below as an example.

First, a substrate (with a thickness of 0.1 mm) made of SUS304 is subjected to ultrasonic cleaning for approximately 10 minutes using an alkaline surfactant. Subsequently, after ultrasonic cleaning is carried out with pure water for approximately 10 minutes, the substrate is washed with pure running water and thereby the surfactant is removed completely. Thereafter, the substrate is dried at 110° C. Next, only the portion to serve as a lyophilic region is covered with a resist film by a photolithographic method using a positive resist. In a dry atmosphere, the substrate with the resist film formed thereon is then dipped into a perfluorooctane solution in which 1 vol % of $CF_3(CF_2)_7C_2H_4SiCl_3$ (silane coupling agent) has been dissolved, for 20 minutes. After that, the substrate is washed in pure perfluorooctane, and perfluorooctane is then removed. Thus, a fluorine-based monomolecular film is formed on the whole substrate. Thereafter, the resist film formed on the substrate is removed with acetone. With these operations, a lyophobic film is formed with the silane coupling agent in the region where the resist film has not been present. As a result, a lyophilic region is obtained in the region where the resist film has been present, while a lyophobic region is obtained in the region other than that.

(2) Production of Silicon Nanowire Dispersion

First, a catalyst such as gold is formed on the surface of, for example, a silicon substrate beforehand. Next, silicon nanowires are grown on the surface of the substrate by the CVD method. Subsequently, the substrate is dipped into a dispersion medium and ultrasound is applied thereto. The ultrasonic waves are applied with a container including the dispersion medium being placed in a bath of an ultrasonic cleaner. This application of ultrasonic waves detaches silicon nanowires from the silicon substrate. Thus, a dispersion of silicon nanowires can be produced.

Silicon nanowires whose surfaces are chemically modified can maintain the wettability to water while having an increased dispersibility in the dispersion medium. This method can prevent the silicon nanowires from aggregating and makes it possible to obtain a nanowire dispersion that is stable for a long period of time. For instance, a substrate with silicon nanowires formed thereon is exposed to a solution containing a silane coupling agent dissolved therein, and thereby the surfaces of the silicon nanowires are chemically modified. This substrate is dipped into a dispersion medium and ultrasonic waves are applied thereto. Thus, a dispersion of chemically-modified silicon nanowires can be formed. For example, a chlorinated solvent of, for example, chloromethane, dichloromethane chloroform, carbon tetrachloride, monochlorobutane, dichlorobutane, monochloropentane, or dichloropentane may be used as the dispersion medium, and a silane coupling agent containing a group in which chlorine has been bonded to carbon may be used as the silane coupling agent. Examples of the silane coupling agent containing a group in which chlorine has been bonded to carbon include $Cl_3CSiCl_3$, $CHCl_2SiCl_3$, $CH_2ClSiCl_3$, $CH_2ClCH_2SiCl_3$, $CH_2ClCHClSiCl_3$, and $CH_3CHClSiCl_3$. The aforementioned chlorinated solvent has polarity, and the surfaces of the silicon nanowires that have been chemically modified with a silane coupling agent also have polarity. Accordingly, the silicon nanowires can be dispersed stably in the dispersion medium for a long period of time.

(3) Attaching Substrate to Arrangement Apparatus

The substrate 100 shown in FIG. 3A is formed into a cylindrical shape as shown in FIG. 3B, which is then fixed to the inner side of the cylindrical tank 11 shown in FIG. 1. It can be fixed by, for example, screwing. In the case of screwing, for example, holes with a diameter of approximately 1 mm are made in several places of the substrate 100, and screw holes are made in the inner wall of the tank 11 in the places corresponding to those of the holes of the substrate 100.

The substrate 100 is a flexible substrate with a thickness of, for example, approximately 0.5 mm. When the shape of the substrate 100 is 180 cm×180 cm square, the tank 11 may be formed to have an inner diameter of 57.3 cm and a length of 180 cm. This allows the substrate 100 to be wound into a cylindrical shape and to be fixed to the inner wall of the tank 11. When 53 liters of dispersion is placed in the tank 11, the distance between the bottom of the tank 11 and the surface of the dispersion is 9.6 cm.

(4) Application of Silicon Nanowires to Substrate

Figure 12:
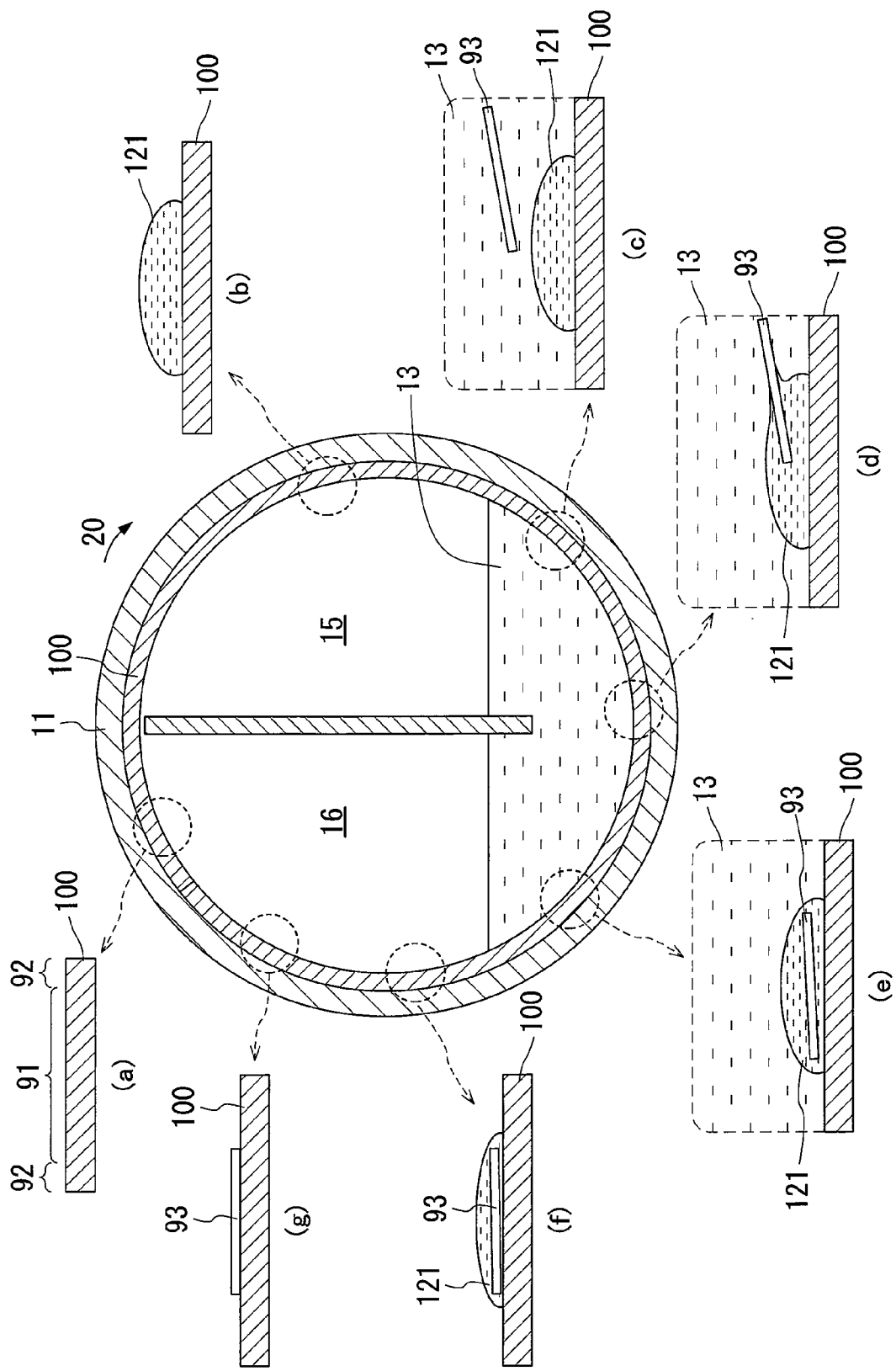
FIG. 12 is a cross-sectional view used for schematically describing an example of the particle arrangement method of the present invention.

FIG. 12 is a schematic view of the arrangement apparatus 10 shown in FIG. 1A viewed from the X direction, wherein the covers 17 and seals 18 are not shown. The substrate 100 attached to the inner wall of the tank 11 rotates around the cylindrical axis in the direction indicated with the arrow 20. FIGS. 12(a) to (g) each are a schematic cross-sectional view of a vicinity of a first region 91 (hydrophilic region) of the substrate 100. With rotation of the substrate 100, the state of the vicinity of the first region 91 of the substrate 100 changes in the order of (a), (b), (c), and (d) and finally into the stage (g). The first space 15 is brought into a high humidity atmosphere by allowing water vapor (with a humidity of 100%) to flow slowly from one opening side to the other opening side of the tank 11. The second space 16 is brought into a low humidity atmosphere by allowing dry nitrogen gas to flow slowly from one opening side to the other opening side of the tank 11.

Hereinafter, the manner in which silicon nanowires are arranged on the substrate 100 is described with reference to FIG. 12.

FIG. 12(a) shows the initial state where the surface of the substrate 100 is exposed to the second space 16. In FIG. 12(a), suppose the silicon nanowires have not been arranged yet in the lyophilic first region 91. In FIGS. 12(b) to (g), the first region 91 and the second region 92 are not indicated.

FIG. 12(b) shows the state where the substrate 100 is exposed to the first space 15. When the substrate is exposed to a high humidity atmosphere, dew condensation of water 121 occurs in the lyophilic region 91. Since the lyophilic region 91 is surrounded by the lyophobic second region 92, the dew condensation water 121 in the region 91 remains stable without expanding to the outside of the region 91.

FIG. 12(c) shows the state where the substrate to which water 121 has adhered is dipped into a dispersion 13 of silicon nanowires. The dew water 121 condensed on the substrate 100 remains stable in the first region 91 of the substrate 100 even in the dispersion 13. This is because water substantially does not dissolve in the dispersion medium of the dispersion 13. The silicon nanowire 93 approaches the vicinity of the water 121 due to a thermal effect.

FIG. 12(d) shows the state where the silicon nanowire 93 is in contact with the water 121 due to the thermal effect. The wettability of the silicon nanowire 93 to water is higher than that of the silicon nanowire 93 to the dispersion medium of the dispersion 13. Accordingly, the silicon nanowire 93 is subjected to force that draws it into the water 121.

FIG. 12(e) shows the state where the silicon nanowire 93 in contact with the water 121 has entered the water 121. The reason why the silicon nanowire 93 enters the water 121 is because the silicon nanowire 93 is energetically more stable in the water 121 than in the dispersion medium of the dispersion 13.

FIG. 12(f) shows the state where the substrate 100 is removed from the dispersion 13 to be exposed to the second space 16. Since the second space 16 has a dry atmosphere, the dispersion 13 on the substrate 100 evaporates. Furthermore, the water 121 on the substrate 100 also is reduced gradually due to evaporation. Since the silicon nanowire 93 has high wettability to water, it does not protrude outside the first region 91 even when the water 121 is reduced.

FIG. 12(g) shows the state where the water has evaporated completely and thereby the silicon nanowire 93 has been arranged in the first region 91. Conceivably, the silicon nanowire 93 and the substrate 100 are bonded to each other through van der Waals force or adsorbed water that is present between the silicon nanowire 93 and the substrate 100.

Even when water substantially does not dissolve in the dispersion medium of the dispersion 13, exposure of water to the dispersion medium for a long time may allow a trace amount of water to dissolve in the dispersion medium. Accordingly, after the silicon nanowire 93 enters the water 121, the water 121 may be dissolved in the dispersion 13 to disappear and the silicon nanowire 93 may adhere to the first region 91. In this case, only the dispersion medium of the dispersion 13 mainly is removed in the second space 16. Furthermore, part of the water 121 may be dissolved in the dispersion 13 and the dispersion medium 13 and the water 121 may be removed in the second space 16.

How the water and the dispersion medium are removed depends on the type of the dispersion medium and the rotation speed of the substrate. In any case, the use of the method according to Embodiment 4 makes it possible to orient and arrange the silicon nanowire in the lyophilic region.

After the state shown in FIG. 12(g), the substrate 100 enters the first space 15 again, and the aforementioned steps are repeated. Only one rotation of the substrate 100, i.e. only one cycle of steps shown in FIGS. 12(a) to (g) does not ensure the arrangement of silicon nanowires 93 in all the first regions 91 on the substrate 100. Accordingly, the substrate 100 may be rotated a plurality of times and thereby the steps shown in FIGS. 12(a) to (g) may be repeated. This makes it possible to arrange the silicon nanowires 93 in all the first regions 93, and to arrange the silicon nanowires 93 on the whole surface of the substrate 100 with high density.

As described above, the inside of the tank 11 may have high humidity only during the early stage, the substrate 100 may be rotated a plurality of times, and finally the inside of the tank 11 may have a dry atmosphere.

As described above, the silicon nanowires 93 are arranged in the first regions 91 of the substrate 100. Subsequently, each cover 17 is detached, with the tank 11 being rotated, and thereby the dispersion 13 is removed from the tank 11. Thereafter, the substrate 100 is removed from the tank 11. Since the dispersion medium of the dispersion 13 evaporates gradually in the second space 16, the tank 11 may be rotated until the dispersion medium evaporates completely. This method allows all the silicon nanowires 93 present in the dispersion 13 to be applied to the substrate 100.

When the substrate is formed into a cylindrical shape and is then fixed to the whole inner wall of the tank as in Embodiment 4, the state of contact with the dispersion and the state of noncontact therewith are the same in any parts of the substrate. Therefore, the silicon nanowires can be arranged uniformly on the whole substrate surface.

The present invention is applicable to methods and apparatuses for arranging particles in predetermined places on substrates. The present invention allows nanocomponents such as silicon nanowires to be oriented and arranged in predetermined places. Therefore, according to the present invention, transistors with silicon nanowires used for channels can be produced easily on a large area substrate. These transistors can be used as, for example, switching elements for driving pixels of EL displays produced on plastic.

The present invention is applicable to other embodiments as long as they do not depart from the spirit and essential characteristics thereof. The embodiments disclosed in this specification are to be considered in all respects as illustrative and not limiting. The scope of the present invention is indicated by the claims, and all changes that come within the meaning and range of equivalency of the claims are intended to be embraced therein.

What is claimed is:

1. A particle arrangement method for arranging particles on a substrate comprising a lyophilic first region and a lyophobic second region, the method comprising steps of:
   (i) arranging a dispersion of the particles in a part inside a container,
   (ii) applying a liquid different from the dispersion to a surface of the substrate to allow the liquid to adhere to the first region, with the particles having higher wettability to the liquid than that to a dispersion medium of the dispersion, and
   (iii) rotating the substrate inside the container to carry out dipping of the substrate into the dispersion and removal of the substrate from the dispersion a plurality of times and thereby arranging the particles on the first region of the substrate.

2. The particle arrangement method according to claim 1, wherein the liquid is water, and
   the dispersion medium is a liquid in which the solubility of water at 25° C. is 10 g or less.

3. The particle arrangement method according to claim 1, wherein the first region is surrounded by the second region, and the first region has higher surface energy than that of the second region.

4. The particle arrangement method according to claim 1, wherein the particles are silicon nanowires.

5. The particle arrangement method according to claim 1, further comprising drying the substrate removed from the dispersion, in the container.

6. The particle arrangement method according to claim 1, wherein the container has a columnar space therein,
   a partition plate is disposed so that the columnar space except the dispersion is divided into a first space and a second space along a direction of an axis of the columnar space,
   the first space is allowed to have a relative humidity of at least 80%, and
   the second space is allowed to have a relative humidity of lower than 40%, and
   thereby a liquid different from the dispersion is applied to a surface of the substrate in step (ii).

7. The particle arrangement method according to claim 1, wherein the container has a columnar space therein,
   the substrate is fixed to an inner wall of the container in the columnar space, and
   the substrate and the inner wall of the container are rotated together in step (iii).

8. The particle arrangement method according to claim 7, wherein the substrate is bent and fixed along the inner wall.

9. The particle arrangement method according to claim 1, wherein the container has a columnar space therein,
   the dispersion is disposed between the substrate and the container,
   the substrate is not fixed to the container, and
   the substrate is rotated independently of the container in step (iii).

10. The particle arrangement method according to claim 9, wherein a partition plate is disposed so that the columnar space formed between the substrate and the container and excluding the dispersion is divided into a first space and a second space along a direction of an axis of the columnar space,
    the first space is allowed to have a relative humidity of at least 80%, and
    the second space is allowed to have a relative humidity of lower than 40%, and
    thereby a liquid different from the dispersion is applied to a surface of the substrate in step (ii).

11. The particle arrangement method according to claim 1, wherein the container has a columnar space therein,
    the container is provided with a plate squeegee and a liquid feed part,
    a side face of the squeegee and a surface of the substrate are parallel to each other, and
    the liquid is fed to the surface of the substrate through a surface of the squeegee from the liquid feed part, and thereby the liquid different from the dispersion is applied to the surface of the substrate in step (ii).

* * * * *

UNITED STATES PATENT AND TRADEMARK OFFICE
CERTIFICATE OF CORRECTION

PATENT NO. : 7,635,500 B2  Page 1 of 1
APPLICATION NO. : 12/164821
DATED : December 22, 2009
INVENTOR(S) : Tohru Nakagawa It is certified that error appears in the above-identified patent and that said Letters Patent is hereby corrected as shown below:

On the title page of the patent, under section "(73) Assignee", change

"PanasonicCorporation" to --Panasonic Corporation--.

Signed and Sealed this

Fifteenth Day of June, 2010

David J. Kappos
*Director of the United States Patent and Trademark Office*